US009988836B2

(12) United States Patent
Judkins

(10) Patent No.: US 9,988,836 B2
(45) Date of Patent: Jun. 5, 2018

(54) CELLULAR MATERIAL FOR WINDOW COVERINGS AND METHOD OF MAKING SAME

(71) Applicant: Ren Judkins, Pittsburgh, PA (US)

(72) Inventor: Ren Judkins, Pittsburgh, PA (US)

(73) Assignee: Hunter Douglas Inc., Pearl River, NY (US)

(*) Notice: Subject to any disclaimer, the term of this patent is extended or adjusted under 35 U.S.C. 154(b) by 0 days. days.

(21) Appl. No.: 13/739,628

(22) Filed: Jan. 11, 2013

(65) Prior Publication Data

US 2013/0180669 A1 Jul. 18, 2013

Related U.S. Application Data

(60) Provisional application No. 61/585,876, filed on Jan. 12, 2012.

(51) Int. Cl.

*E06B 9/06* (2006.01)
*E06B 9/24* (2006.01)
*B32B 37/00* (2006.01)
*E06B 9/262* (2006.01)

(52) U.S. Cl.

CPC ............ *E06B 9/24* (2013.01); *B32B 37/0076* (2013.01); *E06B 9/262* (2013.01); *E06B 2009/2627* (2013.01); *Y10T 156/1051* (2015.01)

(58) Field of Classification Search

CPC ........ E06B 9/24; E06B 9/262; B32B 37/0076
USPC ..................................... 160/84.05, 89, 121.1
See application file for complete search history.

(56) References Cited

U.S. PATENT DOCUMENTS

| | | | | | |
|---|---|---|---|---|---|
| 2,803,578 | A * | 8/1957 | Holland | B31D 5/00 | 156/197 |
| 3,777,800 | A * | 12/1973 | Susoev | A47H 23/01 | 160/330 |
| 4,685,986 | A * | 8/1987 | Anderson | B29D 24/005 | 156/197 |
| 4,974,656 | A * | 12/1990 | Judkins | E06B 9/262 | 160/84.04 |
| 5,158,632 | A * | 10/1992 | Colson | E06B 9/262 | 156/197 |
| 5,205,333 | A * | 4/1993 | Judkins | E06B 9/262 | 160/84.02 |

(Continued)

FOREIGN PATENT DOCUMENTS

| | | |
|---|---|---|
| EP | 0427477 A2 | 5/1991 |
| WO | 94/25719 | 11/1994 |

OTHER PUBLICATIONS

International Search Report for PCT/US2013/021217 dated Apr. 24, 2013.

(Continued)

*Primary Examiner* — Katherine W Mitchell
*Assistant Examiner* — Johnnie A. Shablack
(74) *Attorney, Agent, or Firm* — Buchanan Ingersoll & Rooney PC

(57) ABSTRACT

In a cellular material a first panel having a series of lengthwise accordion folds across the width of the panel, alternate folds projecting toward the front of the panel and the back of the panel is attached to a second panel of material in a manner to create a series of P-shaped cells having a back, an upper cell wall and a lower cell wall in which the upper cell wall and the lower cell wall are curved in a same direction.

13 Claims, 8 Drawing Sheets

(56) References Cited

U.S. PATENT DOCUMENTS

| | | | | |
|---|---|---|---|---|
| 5,313,998 | A * | 5/1994 | Colson | E06B 9/262 156/197 |
| 5,503,210 | A * | 4/1996 | Colson | B29C 65/08 160/121.1 |
| 5,603,368 | A * | 2/1997 | Colson et al. | 160/84.05 |
| 5,649,583 | A * | 7/1997 | Hsu | E06B 9/262 160/84.05 |
| 5,701,940 | A * | 12/1997 | Ford | E06B 9/262 156/197 |
| 5,746,266 | A * | 5/1998 | Colson et al. | 160/84.05 |
| 5,765,260 | A | 6/1998 | Judkins | |
| 5,857,511 | A | 1/1999 | Judkins | |
| 6,662,845 | B1 * | 12/2003 | Palmer | E06B 9/262 160/330 |
| 6,938,664 | B2 * | 9/2005 | Hsu | E06B 9/266 156/292 |
| 7,159,634 | B1 * | 1/2007 | Judkins | B26D 1/09 156/197 |
| 7,191,816 | B2 * | 3/2007 | Colson | E06B 9/262 160/121.1 |
| 7,588,068 | B2 * | 9/2009 | Colson | E06B 9/262 160/121.1 |
| 7,708,047 | B2 * | 5/2010 | Auger | E06B 9/40 160/121.1 |
| 7,971,624 | B2 * | 7/2011 | Harper | E06B 9/264 160/121.1 |
| 8,020,602 | B2 * | 9/2011 | Smith et al. | 160/121.1 |
| 8,151,857 | B2 * | 4/2012 | Colson | E06B 9/262 160/121.1 |
| 8,171,640 | B2 * | 5/2012 | Colson | B29C 53/36 29/525.01 |
| 8,220,518 | B2 * | 7/2012 | Judkins | E06B 9/262 160/34 |
| D671,349 | S | 11/2012 | Judkins | |
| 8,496,768 | B2 * | 7/2013 | Holt | E06B 9/34 156/257 |
| 8,607,838 | B2 * | 12/2013 | Colson | E06B 9/262 160/121.1 |
| 9,080,377 | B2 * | 7/2015 | Holt | E06B 9/34 |
| 9,133,658 | B2 * | 9/2015 | Kuperus | E06B 9/40 |
| 9,316,049 | B2 * | 4/2016 | Rupel | E06B 9/262 |
| 9,376,860 | B2 * | 6/2016 | Josephson | E06B 9/30 |
| 9,506,287 | B2 * | 11/2016 | Giest | E06B 9/262 |
| 9,657,515 | B2 * | 5/2017 | Rupel | E06B 9/262 |
| 2005/0150608 | A1 * | 7/2005 | Auger | E06B 9/40 160/84.05 |
| 2006/0157205 | A1 * | 7/2006 | Auger | 160/84.05 |
| 2009/0266496 | A1 * | 10/2009 | Dann et al. | 160/84.05 |
| 2011/0088852 | A1 * | 4/2011 | Hu et al. | 160/84.05 |
| 2013/0000854 | A1 * | 1/2013 | Dann et al. | 160/84.05 |

OTHER PUBLICATIONS

Written Opinion of the international Searching Authority for PCT/US2013/021217 dated Apr. 24, 2013.

* cited by examiner

CELLULAR MATERIAL FOR WINDOW COVERINGS AND METHOD OF MAKING SAME

CROSS REFERENCE TO RELATED APPLICATION

This application claims the benefit of U.S. Provisional Application No. 61/585,876 filed Jan. 12, 2012.

FIELD OF INVENTION

The invention relates to window coverings, particularly cellular shades.

BACKGROUND OF THE INVENTION

There are three basic types of folded window coverings, pleated shade, cellular shades and Roman shades. The pleated type consists of a single layer of accordion folded or corrugated material. There is also a tabbed single layer of accordion folded or corrugated material which is disclosed in my U.S. Pat. No. 4,974,656. In a cellular shade pleated layers are joined together, or folded strips are stacked to form a series of collapsible cells. The cells may be symmetrical or D-shaped. Roman shades are a flat fabric shade that folds into neat horizontal pleats when raised. Roman shades may be a single sheet of material or may have a second sheet which acts as a liner, Cellular shades are known to have favorable thermal insulation properties because of the static air mass which is trapped between the layers of material when the cells are in the expanded position. The single-layer type, on the other hand, is favored for its appearance in some cases, and is less expensive to manufacture.

Conventionally cellular shades and pleated shades have been made from rolls of non-woven fabric material. In one method of manufacture, pleats or bonds are formed in the material transverse to the length of the roll and in the second method pleats or bonds are formed longitudinally along its length. The output of the transverse method cannot be wider than the roll width of the original material. The longitudinal method is limited in the types of patterns that can be printed on the material because alignment is random. The transverse methods have been limited to a single layer, a single tabbed layer or a triple layer where there are three continuous surfaces that create a panel of double cells.

In U.S. Pat. No. 4,685,986 Anderson discloses a method of making a cellular shade in which two single-panel pleated lengths of material are joined by adhesively bonding them together at opposing pleats. Other methods depart from this Anderson patent by joining together a series of longitudinally folded strips, rather than continuous sheets of pleated material. Such methods are shown in Colson U.S. Pat. No. 4,450,027, and in Anderson U.S. Pat. No. 4,676,855. In the Colson patent, strips of fabric are longitudinally folded into a U-shaped tube and adhered on top of one another, whereas in the Anderson patent these strips are Z-shaped and are adhered in an interlocking position.

Another method for making cellular shades is disclosed in U.S. Pat. Nos. 5,015,317; 5,106,444 and 5,193,601 to Corey et al. In that process fabric material is run through a production line that first screen prints the fabric and then applies thermoplastic glue lines at selected intervals. The fabric is then pleated, stacked, and placed in an oven to both set the pleats and bond the material at the glue lines.

The methods disclosed in these prior art patents require a substantial investment in capital equipment and are designed for large scale manufacture. Hence, these methods are not suitable for fabricators of custom shades who use woven and knitted fabrics.

There are many costs and problems associated with this method of making shades from rolls of fabric. First, the fabricator must store large rolls of material. Each roll must be hung on an axle which is stored in a rack to prevent damage to the material. If the roll is laid length wise on a flat surface over time the material will flatten over the contact area distorting the material. If the roll is stored on end and it tips the edge of the material can be damaged. There is also a practical limit to the width of material which can be purchased in rolls.

Another problem with this method of manufacture is that the fabricator must have a table wide enough and long enough to handle the largest shade which the fabricator will make. Consequently, fabrication space and inventory and handling are large and difficult.

For all these reasons there is a need for a method of manufacture of woven fabric cellular shades which should use less space and require less inventory, reduce fabrication and handling costs, and enable a greater variety of fabrics to be used including fabrics that can also be used for other products.

There is also a need for a pleated or cellular shade that is different in appearance from conventional shades on the market. Such a shade may have asymmetrical shaped cells or larger curved surfaces that appear to overcome the effects of gravity so that these shapes are maintained for the life of the product. The present invention meets those needs.

SUMMARY OF THE INVENTION

I provide a cellular material in which a second panel having a series of lengthwise accordion folds across the width of the panel, alternate folds projecting toward the front of the panel and the back of the panel is attached to a first panel of material at regions adjacent each rearwardly extending fold on the first panel in a manner to create a series of P-shaped cells having a back and an upper cell wall and a lower cell wall in which the upper cell wall and the lower cell wall are curved in a same direction. When viewed from outside the cell, the upper cell wall is convex and the lower cell wall is concave.

I prefer to make the second panel from folded strips of fabric. The strips are bonded together edge to edge to form a tab along each bond. Alternatively the strips may be individually bonded to the first panel. Alternatively, one could use an accordion pleated sheet. The second panel may also be made from folded strips of material, or may be a flat or tabbed sheet or may be single cell or double cell material. However, special heating and clamping equipment is needed to bond cellular material to the second sheet. I prefer that the first panel be made of material that is used as a liner in many types of shade. This material may be white, metalized, black or match the color of the front layer.

Other aspects and advantages of this cellular shade will be apparent from certain present preferred embodiments thereof shown in the drawings.

DESCRIPTION OF THE PREFERRED EMBODIMENTS

Figure 1:
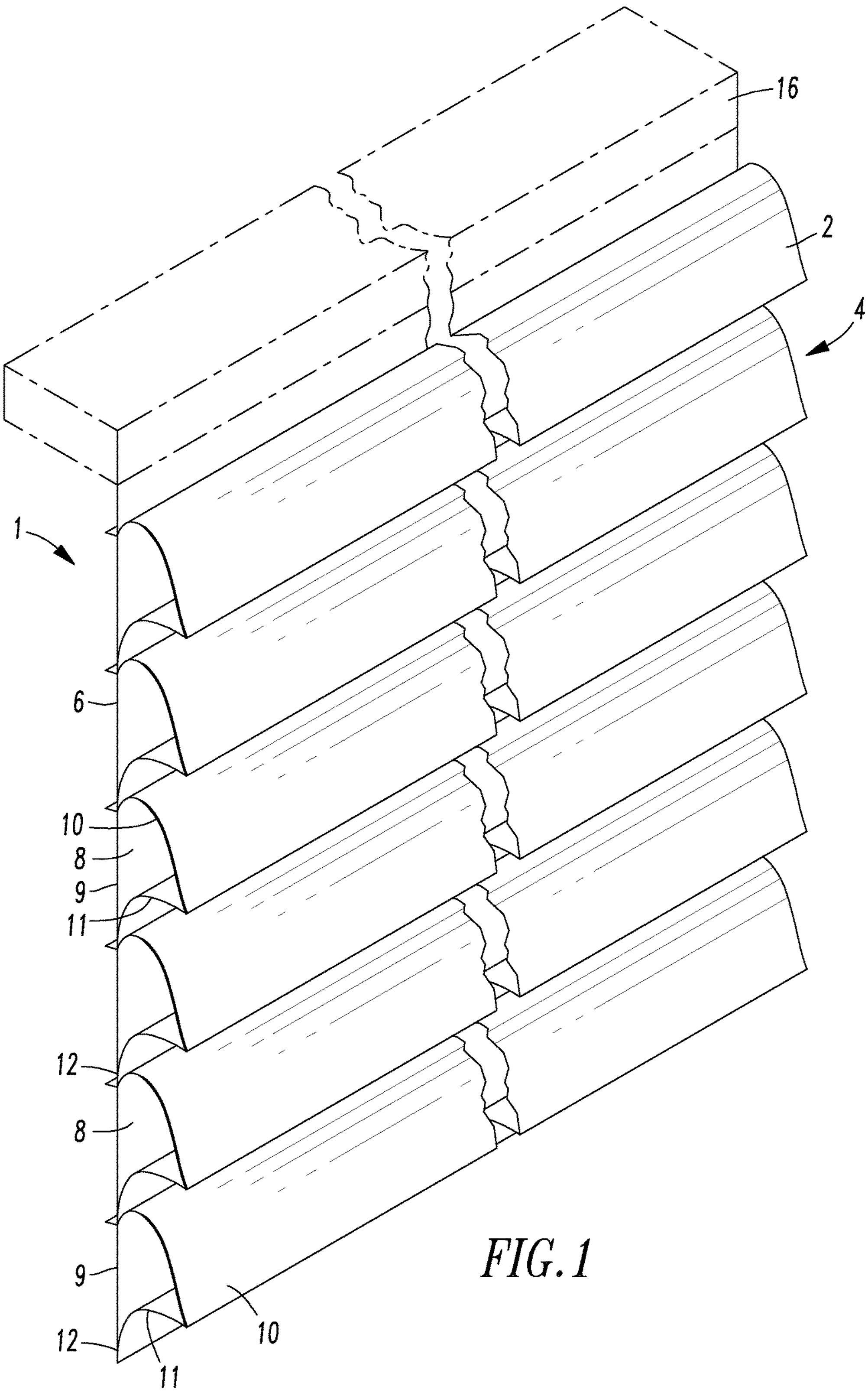
FIG. 1 is a front perspective view of a present preferred embodiment of my cellular shade.
Figure 2:
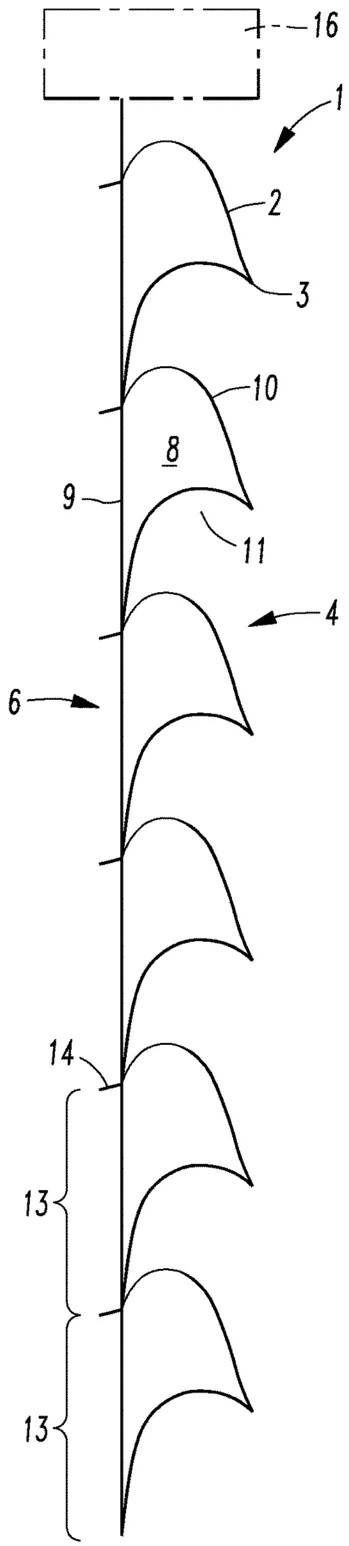
FIG. 2 is a right side view thereof.
Figure 3:
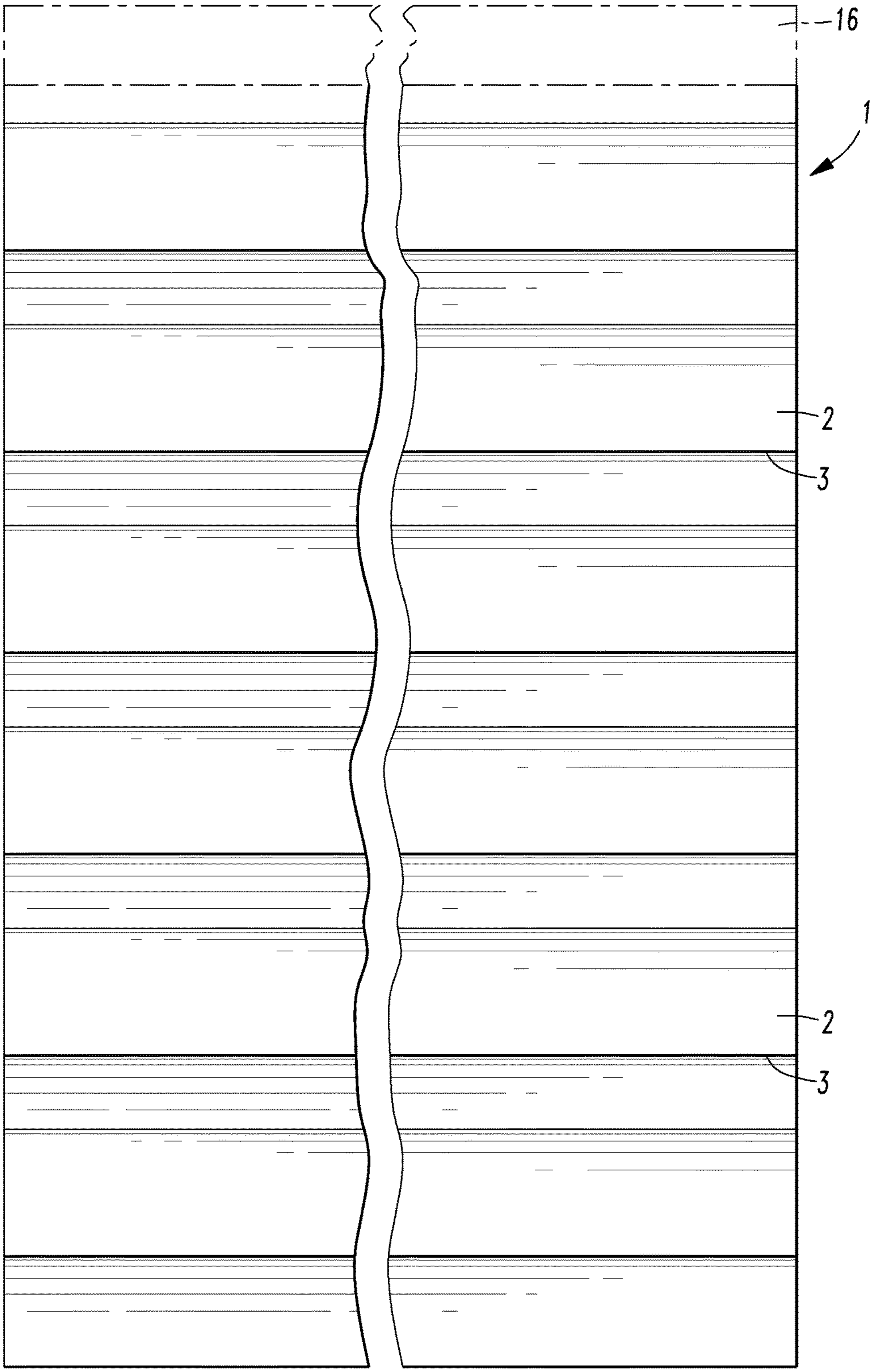
FIG. 3 is a front view thereof.
Figure 4:
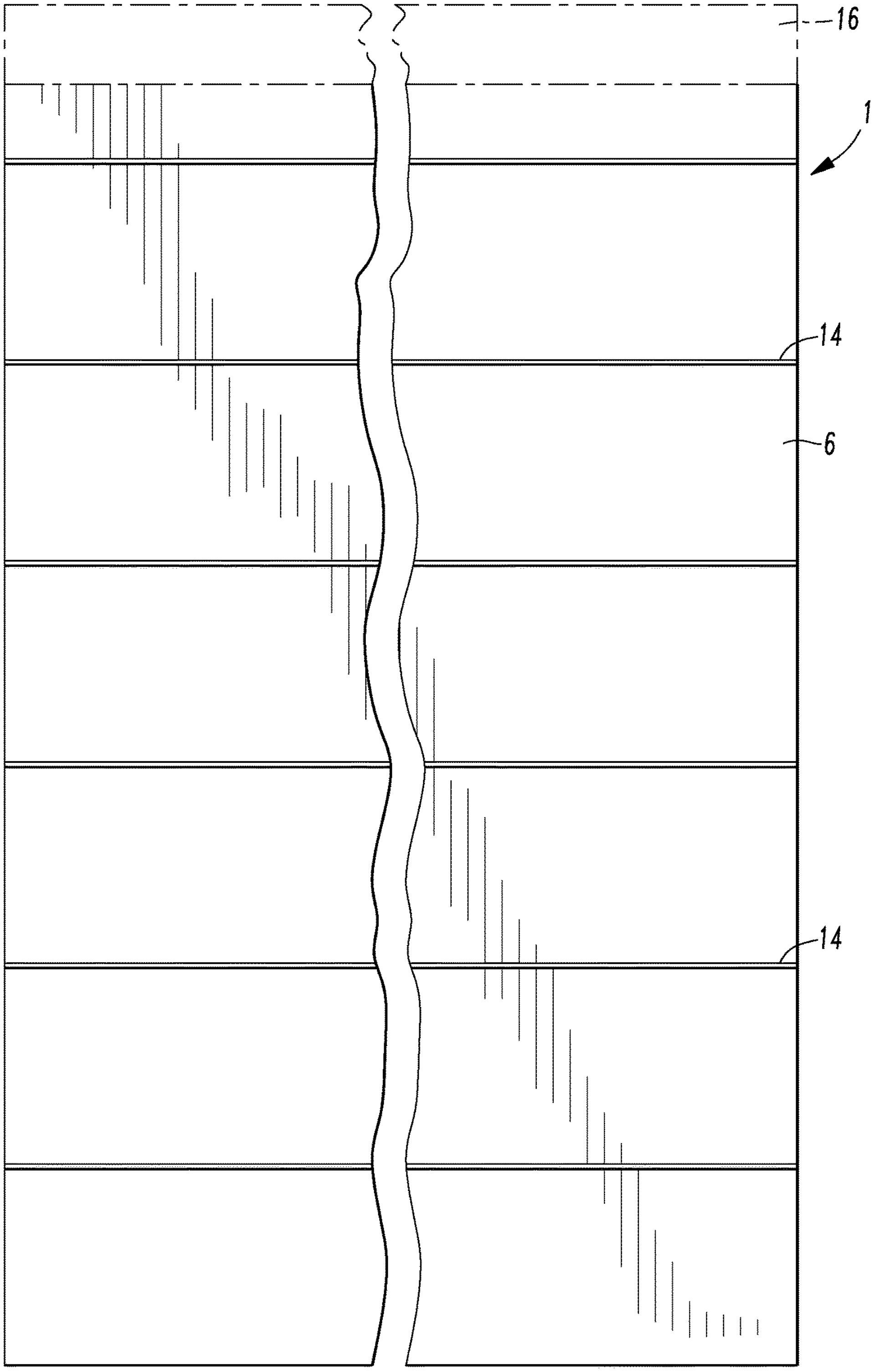
FIG. 4 is a rear view thereof.
Figure 5:
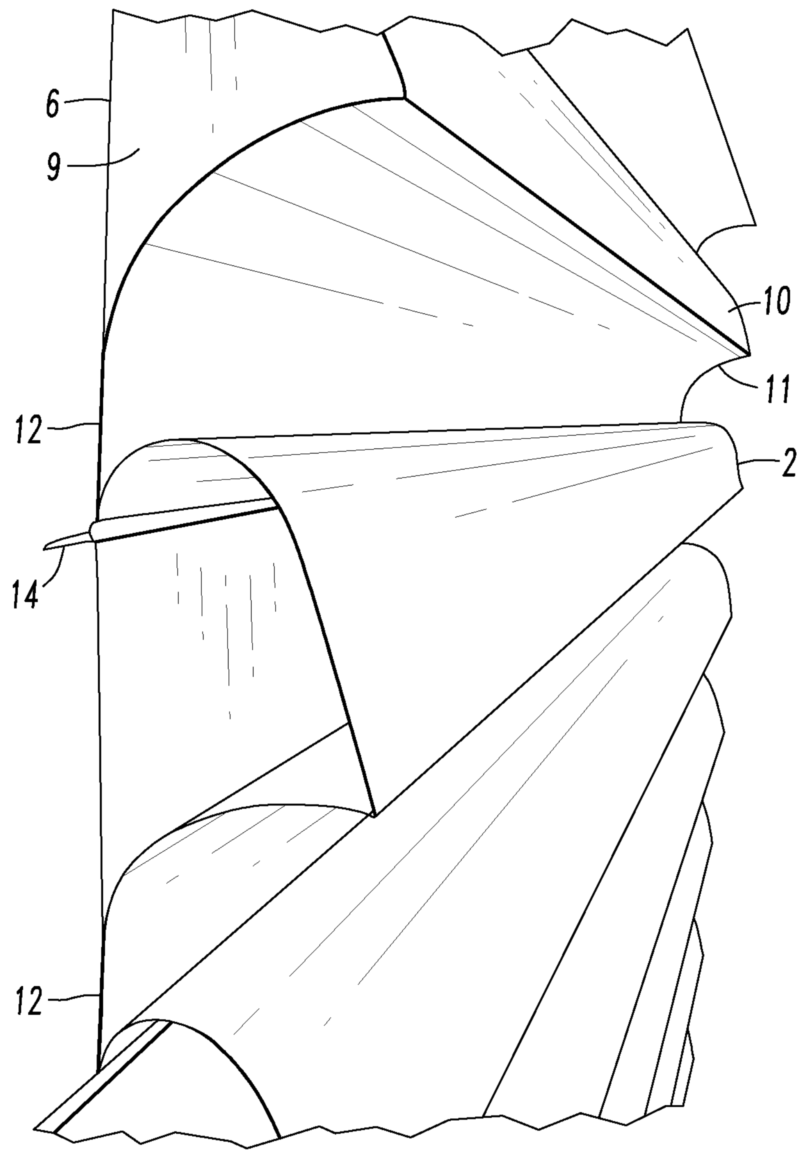
FIG. 5 is a perspective view of an enlarged portion of the embodiment shown in FIGS. 1 through 4 but shown to have a larger bond area.

A first present preferred embodiment of my cellular shade 1 shown in FIGS. 1 through 5 is made from a series of folded fabric segments 2, each having a crease 3, connected together edge to edge to form a pleated panel 4. This panel is then attached to a backing layer 6 in a manner to create a P-shaped cell 8 in which the back 9 of the cell is straight. The other cell walls 10, 11 of the cell 8 are curved in the same upward direction. This curvature is obtained by attaching the pleated panel to the backing layer over a bond area 12 across the width of the shade, such that when the shade is fully extended the bond area 12 will be vertical or near vertical. The width of that area 12 can be quite small or up to half the height of the rear wall of the cell. The bond area preferably is up to two inches in width. As can be seen in FIG. 5 each lower cell wall 11 is attached to the backing panel at bond area 12. The upper cell wall 10 is attached to the backing panel at a smaller bond area (not numbered) within bond area 12 which is near each tab 14. The height of the rear wall is indicated by brackets 13 in FIG. 2. This attachment can be made with one wide or several narrow lines of glue or welded. The backing layer 6 can be a tabbed single sheet of material or made from a series of segments bonded together to form tabs 14. The segments 2 that form the front layer 4 are then attached to the backing layer or panel 6 between the crease 3 and the tabs. Typically the cellular material will be hung from a headrail 16 shown in dotted line in FIGS. 1 through 4. The size of the bond area 12 seen most clearly in FIG. 5 and the stiffness of the fabric determine the shape of the cell walls 10, 11. The ratio of the length of the front pleat to the length of the back pleat also contributes to that shape. Preferably that ration is 1:2 back to front.

Figure 6:
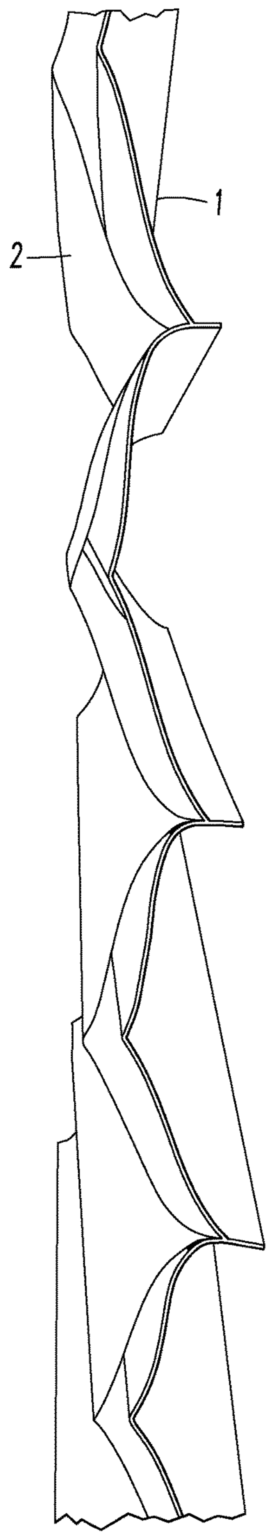
FIG. 6 is a side view of another preferred embodiment of my cellular shade.

The shape of the cells 8 is determined by the relationship of the two curved sides of the cell 10, 11 to the straight side or back 9 of the cell. The shorter the two curved sides are the smaller or narrower each of the cells 8 will be. FIG. 6 shows one embodiment in which the cells are quite narrow. The lower cell wall 11 may be nearly flat in some embodiments.

Figure 8:
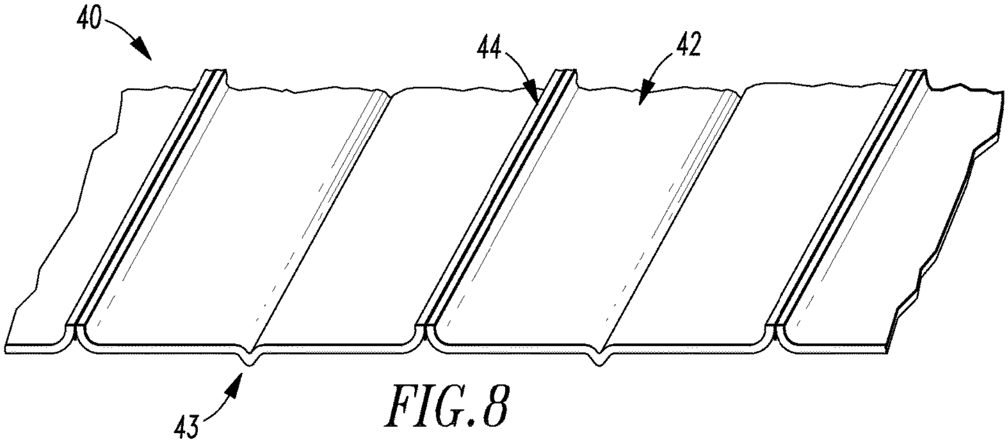
FIG. 8 is a perspective view of a portion of the pleated panel from which the cellular shade can be made.

The pleated panel 4 is preferably made from fabric segments that have been bonded together such as panel 40 shown in FIG. 8. This panel has tabs 44 on one side and creases 43 between each pair of tabs. When this panel is used the tabs 44 are bonded to the back panel 6 very near the tabs on the back panel.

If desired the back panel 6 could be a standard single cell panel or a double cell panel to create a double cell or triple cell shade. Lift cords should be provided for raising and lowering the shade. The back of each of the P-cells will fold into the cell as the material is raised.

Figure 10:
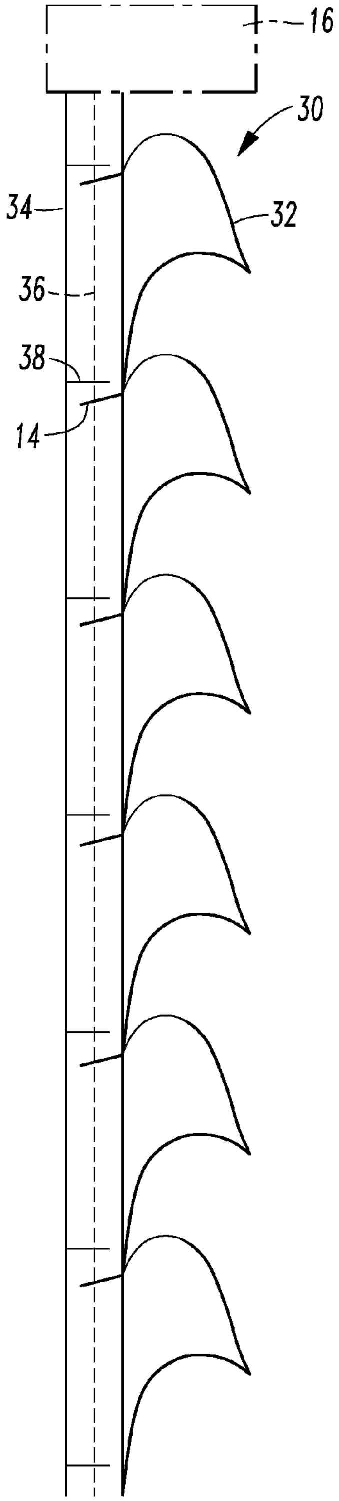
FIG. 10 is a side view similar to FIG. 2 of another embodiment of my cellular shade.

Another embodiment of my cellular shade 30 shown in FIG. 10 has a cellular structure 32 similar to the cellular material shown in FIGS. 1 through 5 to which a tabbed panel or tabbed pleated 34 sheet has been added. Lift cords 36 shown in dotted line in FIG. 10 pass from the headrail through the tabs 38 and 14. This connection is similar to what is disclosed in FIG. 7 of my U.S. Pat. No. 4,974,656.

Figure 9:
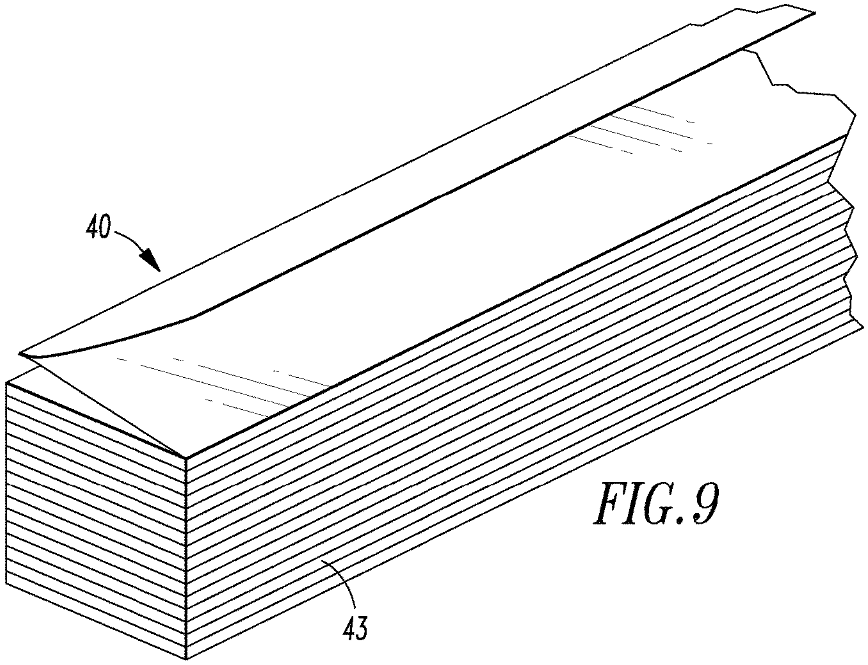
FIG. 9 is an illustration of a stack of one or both of the panels which have been made from segments of material which have been bonded together.

The manufacturer could make the front layer 32 which forms the curved walls of the cells, such as walls 10 and 11 in the embodiment shown in FIGS. 1 through 5 and sell that layer to the fabricator. The front layer will be shipped in a stack 40 shown in FIG. 9. To make the cellular shade the fabricator would buy two stacks of pleated fabric, one for the front layer and a second one for the back panel. The front layer would be an accordion pleat which can be made with any of the common transverse pleaters or with a strip method that creates a tab on one side. The other stack for the back panel could be a Y pleat, such as is disclosed in my U.S. Pat. No. 4,974,656, or a single cell or a double cell. This makes it possible for the fabricator to carry one inventory of front fabric and three layers of back fabric of different opacities. That is significant because the front fabric is usually more expensive than the back fabric. Consequently, the fabricator can make shades of three different opacities with only one expensive fabric. Alternatively, the manufacturer could make the cellular material with P-shaped cells using a very translucent material for the back sheet. Then the fabricator could make a shade with that material alone or the fabricator could use add a second sheet such as sheet 34 in the embodiment shown in FIG. 10.

Figure 7:
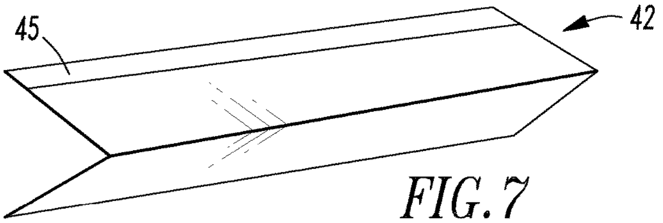
FIG. 7 is a perspective view of a folded segment used to make the cellular shade.

The cellular material can be made from sets of folded segments of material 42 of the type illustrated in FIG. 7. An area 45 adjacent to one or both free long edges of the panel may be coated with a heat activated adhesive. The manufacturer or fabricator selects a sufficient number of segments to make a shade of a desired length and places them one upon another. Then the set of fabric segments is placed in an oven to bond the folded segments together. The glued edges of adjacent segments will form a tab 44. Consequently, a pleated and tabbed panel 40 a will be formed. FIG. 8 shows a portion of such a panel. The panel 40 has a set of folded, fabric segments 42 bonded together in series to form tabs 44. The folds or creases 43 should be centered such that the panels on either side of the fold are the same size. That size or panel width preferably is 4, 6, 8 10 or 12 inches. These edges of adjacent segments preferably are bonded with an adhesive, such as polyester or polyurethane, or ultrasonically welded. One could sew the edges together. However, welding and bonding with an adhesive are much more precise. Bonds can be applied with the tolerance of plus or minus 25 thousandths, whereas, stitching has a tolerance of plus or minus 50 thousandths. When the edges are bonded together, they form a tab 44. The tab should have a width of one-half inch or less. Preferably this tab is made or trimmed down to be a micro tab having a width one eighth of an inch or less. The folded segments 42 can be made from woven or non-woven fabric as well as from film or paper.

There will be significant savings in shipping and handling because the fabricator is working with boxes and stacks of material rather than rolls of material. Savings comes from not combining the expensive fabric layer with the light control densities of the back layer until the final product is made allowing the front layer to be used on other products like such as a roller shade with an accordion pleat or with a blackout back layer or a sheer back layer or a light filtering back layer. A manufacturer of pleated panels will ship stacks of fabric with different dimensions in boxes that are easily handled and stored on ordinary shelving and require very simple equipment for sizing. The fabric stacks are easy to store and ship and take much less room than rolls of fabric. The manufacturer can have specialized equipment for handling rolls and can take rolls of fabric of almost any size, cut the fabric into narrow widths, then remove flaws and then convert the fabric into very wide 12 foot tabbed accordion folded layers. Common widths of many woven goods are 36", 45", 54", 60", 72" and 96" (which is much less common). Supply is more competitive in narrower widths. Because the width of the shade to be fabricated is determined by the length of the stack rather than the width of the fabric on a roll, there is no limit to the width of the shade which can be made up to the length of the stack. Should a flaw or broken thread appear in the fabric as it is being taken off the roll to be made into a tabbed accordion folded stack, that portion of the material can be cut out and discarded.

The window covering material can alternatively be formed from a sheet of material in which tabs have been formed. The sheet is folded to form an accordion pleat and to create a stack similar to that shown in FIG. 9. Continuous beads of adhesive can be applied at spaced apart intervals along alternate folds. After the stack is made the adhesive can be activated. Tabs or microtabs are then formed at the glue lines. If desired the tabs may be cut or sanded to make them smaller. Typically this material removal process will be done when the sheet has been folded into a stack that has all of the tabs on one side of the stack.

Although I have shown and described certain present preferred embodiments of my cellular material for window coverings and methods of making that material and window coverings containing that material, it should be distinctly understood that the invention is not limited thereto but may be variously embodied within the scope of the following claims.

I claim:

1. A cellular material comprising:

a first panel of a first material having a length, a width, a top, a front and a back, the first panel having a series of lengthwise accordion folds across the width of the first panel, alternate folds of the accordion folds projecting toward the front of the first panel and toward the back of the first panel;

a second panel of a second material to which the first panel is attached at attachment regions in a manner to create a series of substantially P-shaped cells, each cell comprised of the first panel, an upper cell wall connected to the first panel at a first bond area, a lower cell wall connected to the first panel at a second bond area, the first bond area being less than the second bond area, and a crease that separates the upper cell wall from the lower cell wall in which a portion of the upper cell wall and a portion of the lower cell wall extend upward from the first panel toward the top of the first panel and are curved in a same direction and when viewed from outside the cell, the upper cell wall is convex and the lower cell wall is continuously concave from the second bond area to the crease; and at least one lift cord connected to the first panel for raising and lowering the cellular material, such that the first panel of each of the P-shaped cells will fold toward the second panel as the cellular material is raised.

2. The cellular material of claim 1 also comprising tabs extending rearwardly from the first panel.

3. The cellular material of claim 1 also comprising a tab at each lengthwise accordion fold on the first panel projecting toward the back of the first panel such that the lengthwise accordion folds which project toward the back of the first panel and the tabs are the attachment regions where the first panel is attached to the second panel.

4. The cellular material of claim 1 wherein at least one of the first panel and the second panel is comprised of strips arranged side by side, adjacent strips being attached together.

5. The cellular material of claim 1 wherein at least one of the first panel and the second panel is a single sheet.

6. The cellular material of claim 1 wherein the first panel and the second panel are attached together by an adhesive, by ultrasonic welding or by heat sealing.

7. The cellular material of claim 1 wherein the attachment regions where the first panel is attached to the second panel have a width of up to two inches.

8. The cellular material of claim 1 wherein at least one of the first material and the second material are selected from the group consisting of woven fabrics, knitted fabrics, non-woven fabrics, film and paper.

9. The cellular material of claim 1 also comprising a headrail from which the top of the first panel and the second panel are hung.

10. The cellular material of claim 9 also comprising a third panel of a third material extending from the headrail and to which the at least one lift cord is connected.

11. The cellular material of claim 9 also comprising a tabbed panel of a third material extending from the headrail wherein the second panel and the tabbed panel each have a set of tabs and the at least one lift cord passing through the tabs.

12. A cellular material comprising:

a first panel of a first material having a length, a width, a top, a front and a back, the first panel having a series of accordion folds across the width of the first panel, alternate folds of the accordion folds projecting toward the front of the first panel and toward the back of the first panel; and a second panel of a second material to which the first panel is attached at attachment regions in a manner to create a series of substantially P-shaped cells, each cell comprised of the first panel, an upper cell wall connected to the first panel at a first bond area a lower cell wall connected to the first panel at a second bond area and a crease that separates the upper cell wall from the lower cell wall in which a portion of the upper cell wall and a portion of the lower cell wall extend upward from the first panel toward the top of the first panel and are curved in a same direction and when viewed from outside the cell, the upper cell wall is convex and the lower cell wall is continuously concave from the second bond area to the crease;

wherein the upper cell wall has a first length corresponding to a distance between the crease and a point at which the upper cell wall is connected to the first panel, and the lower cell wall has a second length corresponding to a distance between the crease and a point at which the lower cell wall is connected to the first panel, that distance between the crease and a point at which the lower cell wall is connected to the first panel including the portion of the lower cell wall in the second bond area, and wherein the first length is the same as the second length and the first length is greater than a third length equal to the second length minus a length of the second bond area.

13. A cellular material comprising:

a first panel of a first material having a length, a width, a top, a front and a back, the first panel having a series of lengthwise accordion folds across the width of the first panel, alternate folds of the accordion folds projecting toward the front of the first panel and toward the back of the first panel;

a second panel of a second material to which the first panel is attached at attachment regions in a manner to create a series of substantially P-shaped cells, each cell comprised of the first panel, an upper cell wall connected to the first panel, a lower cell wall connected to the first panel and a crease that separates the upper cell wall from the lower cell wall in which a portion of the upper cell wall and a portion of the lower cell wall extend upward from the first panel toward the top of the first panel and are curved in a same direction and when viewed from outside the cell, the upper cell wall is convex and the lower cell wall is continuously concave from one of the attachment regions to the crease; and at least one lift cord connected to the first panel for raising and lowering the cellular material, such that the first panel of each of the P-shaped cells will fold toward the second panel as the cellular material is raised.

* * * * *